US008565389B2

(12) United States Patent
Shaw

(10) Patent No.: US 8,565,389 B2
(45) Date of Patent: Oct. 22, 2013

(54) ON DEMAND VISUAL VOICEMAIL-TO-TEXT SYSTEM AND METHOD

(75) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 340 days.

(21) Appl. No.: 12/814,884

(22) Filed: Jun. 14, 2010

(65) Prior Publication Data

US 2011/0305327 A1    Dec. 15, 2011

(51) Int. Cl.
*H04M 11/00* (2006.01)

(52) U.S. Cl.
USPC .................. 379/88.14; 455/414.4; 455/432.2

(58) Field of Classification Search
USPC .............. 379/88.11–88.28; 455/414.4, 432.2
See application file for complete search history.

(56) References Cited

U.S. PATENT DOCUMENTS

| | | | |
|---|---|---|---|
| 6,580,784 B2* | 6/2003 | Rodriguez et al. | 379/88.12 |
| 7,136,462 B2* | 11/2006 | Pelaez et al. | 379/88.14 |
| 7,257,649 B2* | 8/2007 | Rabbers et al. | 709/248 |
| 7,428,580 B2* | 9/2008 | Hullfish et al. | 709/207 |
| 8,265,236 B2* | 9/2012 | Brooks et al. | 379/88.17 |
| 2002/0052218 A1* | 5/2002 | Rhee | 455/552 |
| 2002/0156832 A1* | 10/2002 | Duri et al. | 709/203 |
| 2003/0013444 A1* | 1/2003 | Watanabe et al. | 455/435 |
| 2005/0266829 A1* | 12/2005 | Tran et al. | 455/412.1 |
| 2006/0217159 A1* | 9/2006 | Watson | 455/563 |
| 2009/0254561 A1* | 10/2009 | Shao et al. | 707/9 |
| 2010/0219836 A1* | 9/2010 | Svensson et al. | 324/426 |

* cited by examiner

*Primary Examiner* — Duc Nguyen
*Assistant Examiner* — Assad Mohammed
(74) *Attorney, Agent, or Firm* — Woodcock Washburn LLP

(57) ABSTRACT

Voicemail messages are transcribed to text in accordance with a subscriber preference. When a new voicemail message is detected or a request to retrieve a voicemail message is detected, a voicemail to text device may alter its behavior based on the voicemail to text subscriber preference and a mobile device status. Subscriber preferences can comprise location (e.g., GPS, AGPS, roaming, international, or national boundaries), date, time, and network resources. Voicemail to text can automatically be re-enabled/disabled based on subscriber preferences set by a subscriber or network provider. A subscriber or network provider can initiate a state change (enable/disable) of voicemail to text.

10 Claims, 8 Drawing Sheets

ON DEMAND VISUAL VOICEMAIL-TO-TEXT SYSTEM AND METHOD

TECHNICAL FIELD

The technical field generally relates to telecommunications and more specifically relates to messaging devices and services.

BACKGROUND

There are several different types of telecommunications messaging services, such as voicemail, visual voicemail, text messaging, multimedia messaging, and e-mail, among others.

Voicemail (VM) offers a means of electronically sending, receiving, and storing audio messages. Visual voicemail (VVM) displays voicemail message descriptive information in a graphical form and allows users to choose which message to listen to, delete, and save, among other similar options. Text messaging, also known as "texting," refers to the exchange of brief text messages between devices, such as mobile devices on a wireless network. Commonly, text messages are sent via Short Message Service (SMS). A common standard for sending multimedia messages is Multimedia Messaging Service (MMS). E-mail is another popular way of exchanging messages which usually allows for messages that are more extensive than text messages. Subscribers can become inundated with the aforementioned messages throughout the day.

SUMMARY

Disclosed are systems and methods for providing voicemail to text (VMTT) transcription on demand. In an example embodiment, a VMTT subscriber preference is set by a network provider or a subscriber. When a new VM message is detected or a request to retrieve a VM message is detected, a VMTT device may alter its behavior based on the VMTT subscriber preference and a mobile device status. The behavior of the VMTT device can be determined by several different mobile device statuses and preferences alone or in combination. For example, the subscriber preference can comprise a location of a mobile device, date and time information, an importance indicator, and network conditions, among other things.

BRIEF DESCRIPTION OF THE DRAWINGS

The following detailed description of embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
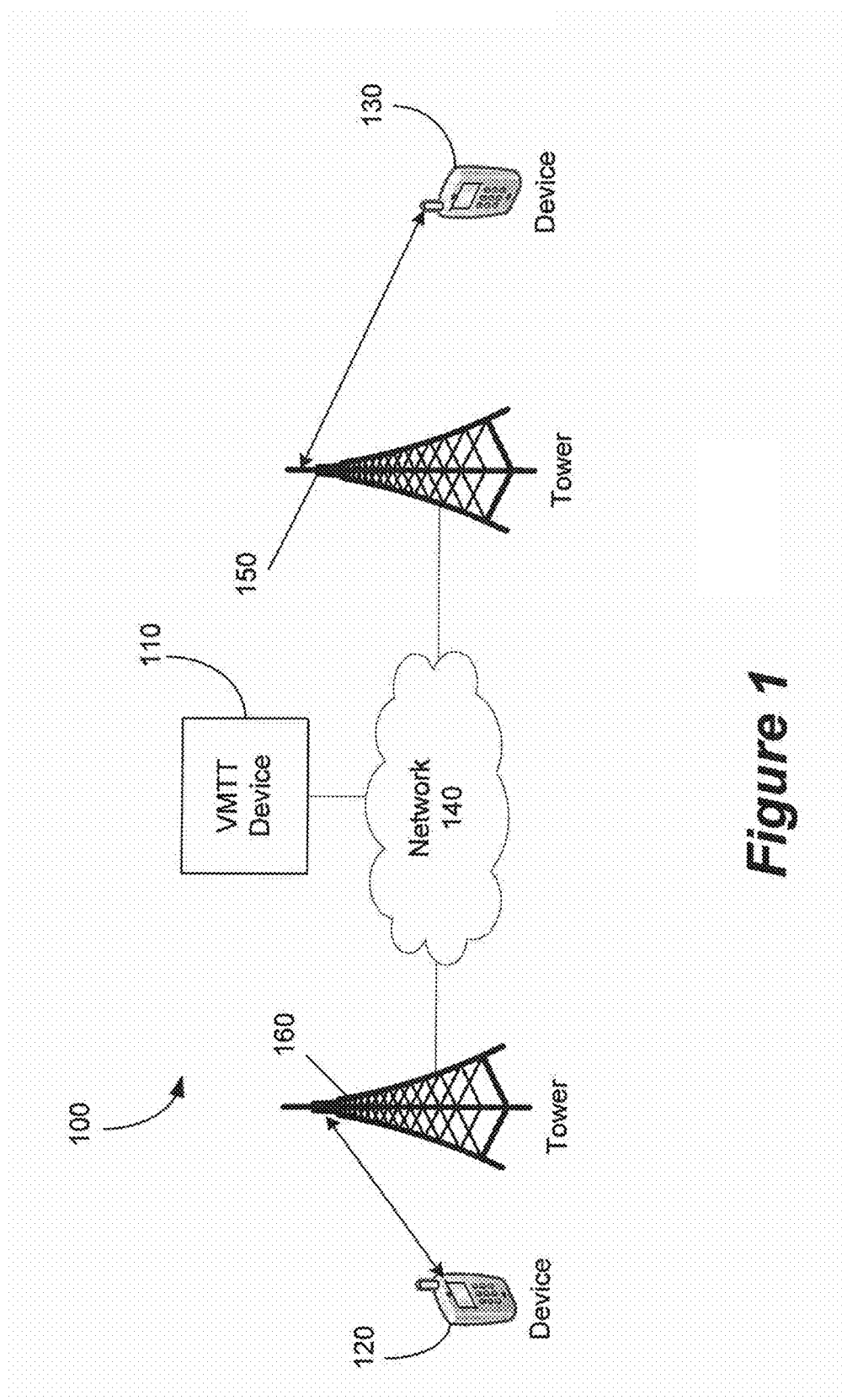
FIG. 1 is a graphical representation of an exemplary, non-limiting network in which on demand VMTT may be implemented.

FIG. 1 illustrates a non-limiting example of a network 100 in which the on-demand voice mail to text transcription can be implemented. It should be understood that some elements have not been illustrated so as not to obscure the present disclosure. In an embodiment, a VMTT device 110, within a network 140 may determine whether to transcribe a VM message and send it to a subscriber mobile phone. VMTT may be a supplemental service to VVM, which may allow a VM message to be transcribed to a text message. VMTT may allow a subscriber to have an entire VM message transcribed to text and delivered to a mobile phone or other device via e-mail or SMS, for example. A VMTT device 110 is illustratively defined as any device that can receive, store, or do any other computing functions that perform the functions of on demand voice mail to text. A VMTT device 110 can be one device or can functionally be separated into several different devices. Tower 160 may allow mobile device 120 to connect to the VMTT device and other devices and services connected to the network. In addition, tower 150 may allow mobile device 130 to connect to the VMTT device and other devices and services connected to the network 140.

A subscriber may not desire additional and/or duplicated VMTT messages added to the myriad of messages the subscriber may already receive (e.g., a subscriber may receive e-mail, VM, SMS, MMS, VVM, and/or VMTT). Users do not require VMTT service all the time. The power to actively and seamlessly set preferences of how messages are exchanged may enhance the utility of messaging for subscribers and reduce strain on network resources.

A VMTT device can consider several different preferences. Preferences can be set on a network device, which may be set via a mobile phone, via a personal computer, or via any device (mobile or not) that will allow communication with a VMTT device. Preferences can be set by a network provider, a message recipient, or any other person or device that has access to change preferences. Transcribed messages may be sent to a subscriber's mobile device and stored (e.g., SMS) or stored on a server for the subscriber to retrieve (e.g., network e-mail box). Disclosed herein are methods, systems, and devices that may help implement VMTT messaging services.

A VMTT device may also consider the status of a mobile device. A status can comprise any state of the device. For example, the status of a mobile device may be the location of the device, whether or not the device is roaming, the motion/movement of the device, the battery power of the mobile device, and/or other software and/or hardware states (e.g., software versions, processor and memory resources), among other things.

Figure 2:
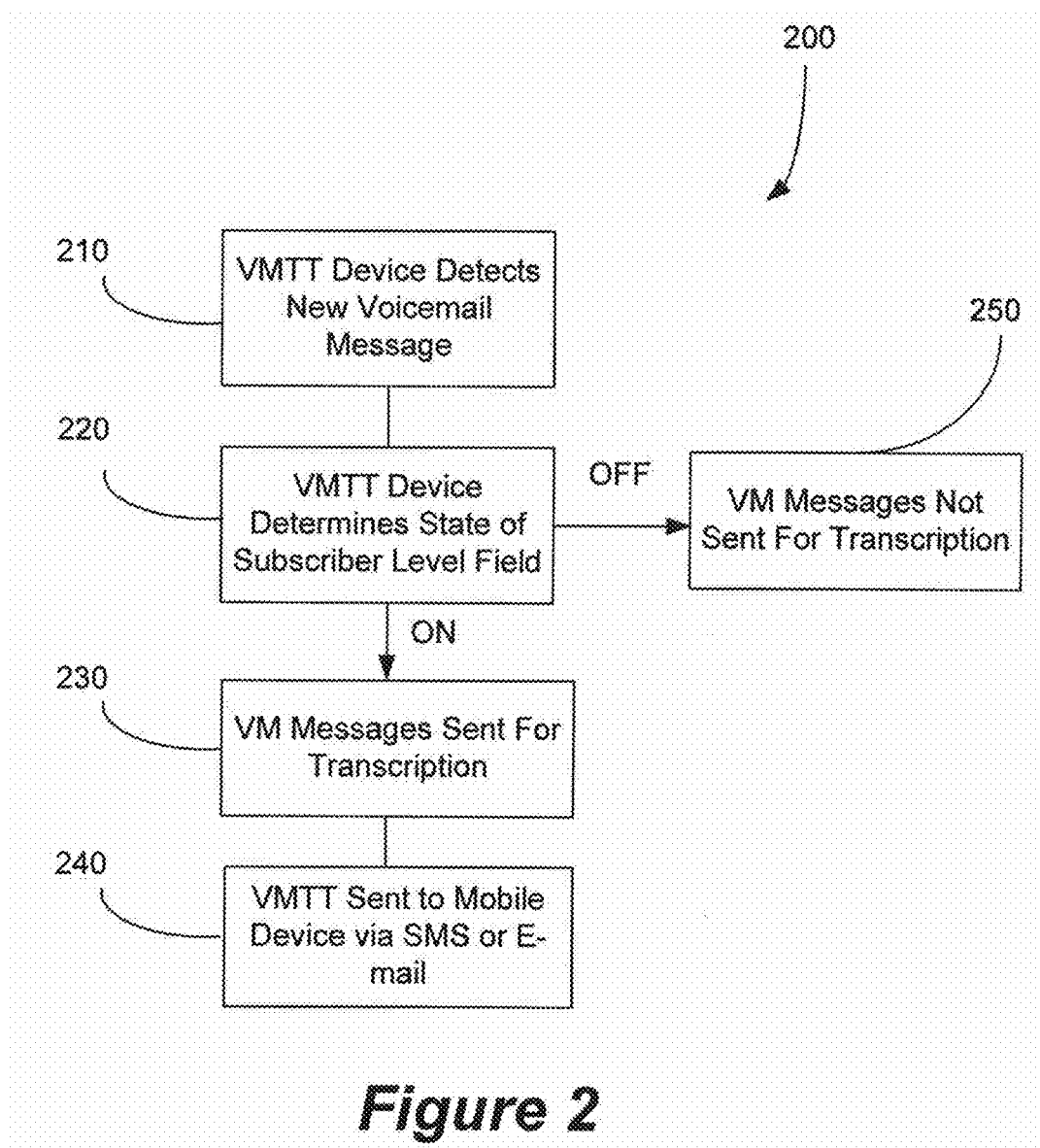
FIG. 2 illustrates a non-limiting, exemplary method of implementing on demand VMTT by using a VMTT device with a subscription level field.

In FIG. 2, method 200 of implementing aspects of on-demand voicemail to text transcription is illustrated. In an embodiment at block 210, a VMTT device detects a new voicemail message, wherein a new message can be defined as any message not listened to by a subscriber or other authorized third party. At block 220 the VMTT device can determine the state of the subscriber level field, wherein the subscriber level field is an indication (preference) of whether the VMTT service is set to "on" or "off" for a subscriber. If the subscriber level field is set to "off" then the VM messages received after "off" has been set will not be sent for transcription, at block 250. If the subscriber level field is set to on then the VM messages are sent for transcription, at block 230. At block 240, a VMTT message may be sent to the subscriber's mobile device via e-mail or SMS.

In an embodiment, VM messages received between the time the subscriber level was set to "off" and subsequently set to "on" may continue to be ignored for transcription. A subscriber may have the preference of transcribing his choice of VM messages (e.g., messages that have not been transcribed and even those that have already been transcribed and sent to a subscriber device). For example, at the time a subscriber attempts to retrieve a voicemail message, the voicemail message may be converted to text or not.

In an embodiment, a VMTT descriptor may be added to VVM message data to determine if transcription should be subsequently transcribed when the subscriber level field is set to "on." For example, a VVM (or VM) message may indicate the date and time of a call, the identity of the caller, the length of the message, among other things. In addition, the VVM (or VM) message may contain information regarding the current state of the VMTT service and the preference (e.g., location) that may change the current state of the VMTT service.

Figure 3:
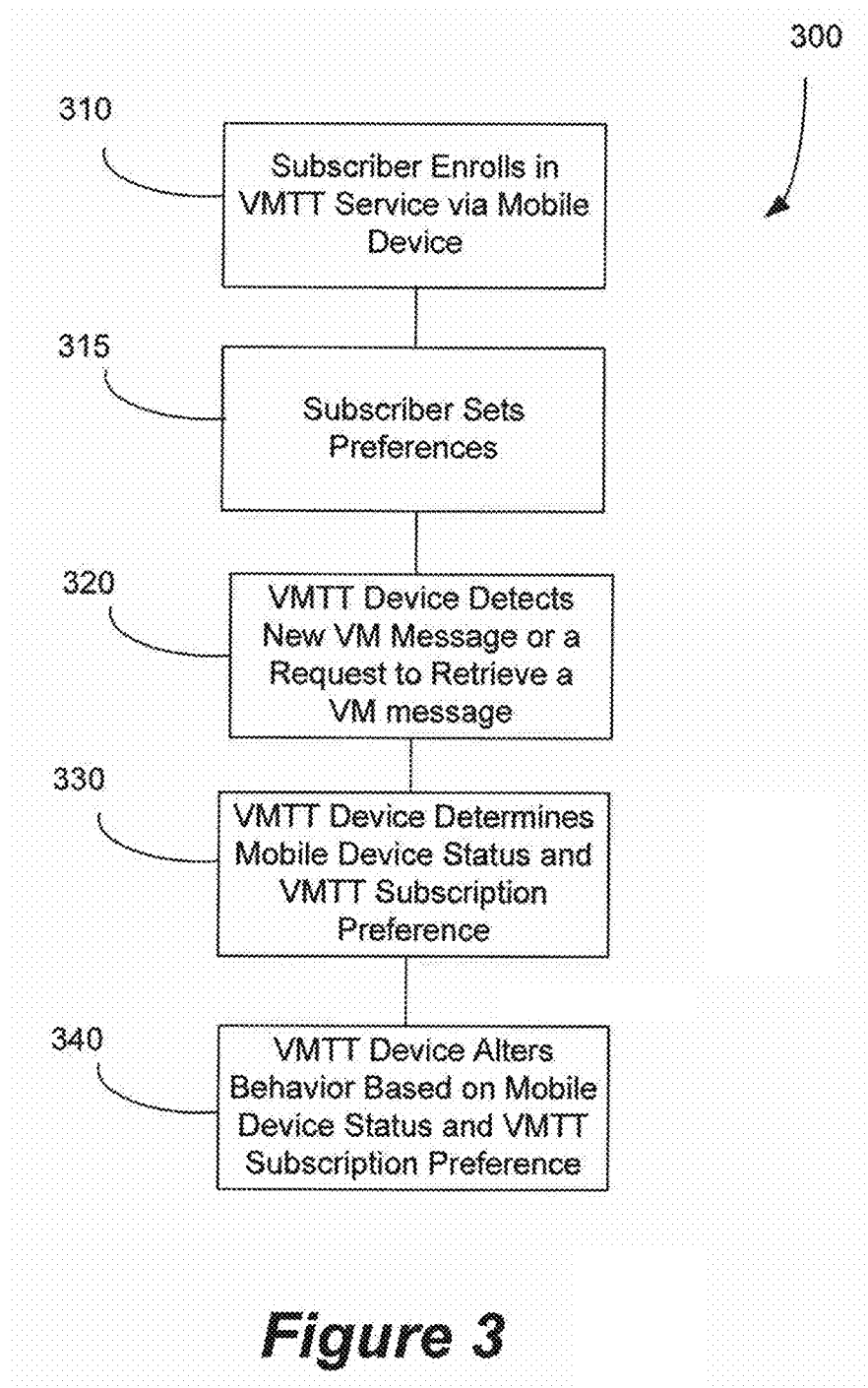
FIG. 3 illustrates a non-limiting, exemplary method of implementing on demand VMTT by using a VMTT device with a subscription preference.

In FIG. 3, method 300 of implementing aspects of on-demand voice mail to text transcription is illustrated. In an embodiment at block 310, a subscriber may enroll in VMTT service via his/her mobile device. At block 315 the subscribers sets VMTT service preferences. At block 320, a VMTT device may detect a new VM message or a request from a mobile device to retrieve a voicemail message. The VMTT device may determine a mobile device status and a VMTT subscription preference at block 330. At block 340, the VMTT device may alter its behavior based on the VMTT subscription preference and the mobile device status.

In an embodiment, the VMTT device can enable or disable VMTT based on a date and/or time preference, such as whether it is a weekend, a scheduled vacation, a scheduled meeting, or any other time period. For example, a subscriber can set her subscription preference to only receive VMTT messages on the weekend and not during the weekday. The subscriber may believe that this configuration reduces the clutter in her e-mail box during the week. The subscriber may have the advantage of listening to VM messages on the commute to and from work during the week, and may not want to concern herself with transcribed messages cluttering her inbox. In another embodiment, the network provider can schedule a subscriber to only have VMTT during the weekends in order to encourage the subscriber to upgrade to a plan more profitable to the provider and/or reduce the load on the VMTT device during the week.

In an embodiment, the VMTT device can enable or disable VMTT based on a location preference. The location preference, for example, can be based on whether the subscriber device is roaming out of a home network. The location preference can also be based on GPS coordinates which can include interstate (e.g., disable in New York and enable in Georgia) and international travel coordinates (e.g., disable in Spain and enable in Italy). For example, a subscriber may want to disable VMTT when roaming during international travel, because text message delivery via foreign operators can be costly. In another example embodiment, a subscriber can set a preference to disable VMTT when traveling internationally and the network can enable VMTT automatically when the subscriber device returns.

In an embodiment, the VMTT device can enable or disable VMTT based on the status of network resources. Status of network resources can include network condition, traffic loading, systems performance optimization, and/or any status that can prevent the network from sending data at an expected rate. The status of network resource may include router, switches, mobile devices, network towers, landlines, or other devices or resources described herein. If a natural disaster occurred, for example, which decreased network bandwidth to a minimal level, a VMTT device may determine that it would be appropriate to enable VMTT (if disabled) and delete the audio of transcribed VM messages rather than hampering network resources in order to allow a subscriber to check and/or save VM messages. In another embodiment, mobile device resources status can be considered. For example, a mobile device may have limited memory to hold an audio file for VVM and therefore a VMTT message may be more appropriate. In another example, a mobile devices processor may be overwhelmed and it may be more appropriate to send a VMTT message initially and then send an audio file to the mobile device after the processor has returned to a more appropriate state.

Determining whether to transcribe or not to transcribe a message may hinge on the status of a mobile device. There may be a triggering event that establishes when a VMTT device determines the status of a mobile device (voicemail status triggering event). As stated herein, the status may be the location of the device, the motion (speed) of the device, the state of the memory (e.g., low available memory), among other things. The status of the device may be determined at different times. For example in method 300, the mobile device status may be taken at a time a new VM message is received or at a time of a request to retrieve a VM message.

In an example embodiment, the VMTT device may determine the state of a default mobile device or multiple default devices. The default device status may have a voicemail status triggering event which may comprise the detection of a new VM message. The VMTT device may determine according to the default device status along with subscriber preferences to transcribe the new VM message and send the transcribed message via an e-mail, SMS, or VVM format to the default device.

In another example embodiment, a subscriber of the VMTT service may decide to retrieve a VM message from a mobile device that is not the default mobile device. In this scenario, the VMTT device can detect the VM message retrieval, wherein the retrieval of the VM message is the voicemail status triggering event, and can determine the status of the retrieving device (the device the subscriber is connecting from). For example, the retrieving mobile device status may be that the retrieving mobile device is capable of receiving SMS text messages. The subscriber may set her/his preference so that she/he can have the VMTT device transcribe the VM message and have the transcribed message sent to the retrieving mobile device via SMS text messaging. For voicemail to text on demand service, a retrieving mobile device and a default mobile device can be the same device or, as described herein, the default mobile device may be different from the retrieving mobile device.

There can be a combination of preferences and factors in order for the VMTT device to determine whether to enable or disable VMTT. For example a subscriber can set his preferences to disable VMTT, if the subscriber mobile device is roaming, during a weekend, and if the subscriber mobile device is in a particular GPS coordinate range. In another example, a subscriber can set preferences to enable VMTT and send VMTT messages to the device the subscriber is currently using (which can be any device, such as the default device or a device other than the default device) if he requests to retrieve a message from a device that is in a particular region (e.g., Georgia), during a particular time frame (e.g., 8 am to 5 pm), and if the currently used device is capable of receiving text messages. In another example, a preference set by a subscriber can be overridden by a preference set by a network provider, such as in a disaster relief scenario. Note a subscriber or network provider can initiate enablement or disablement of a VMTT service.

In an embodiment, an importance indicator can be set to determine if VMTT should be enabled or disabled. The importance indicator may be set by the network provider, subscriber, and/or another authorized party. For example, a party who leaves a VM message may choose to append and importance indicator (e.g., high importance, medium importance, or low importance) to his VM message to the subscriber. The subscriber and or network provider may handle the VM message differently for varied levels of importance. For example, if the VM message has an indicator of high importance then the subscriber may set her preferences so the VM message is transcribed and sent to her via e-mail and SMS text. If the message has an indicator of low importance then the subscriber may not want the VM message transcribed. The subscriber may want to listen to her VM message during her commute home and may not want a transcribed copy cluttering her e-mail box.

In an embodiment, a VMTT device can enable or disable VMTT based on a recipient identifier. The recipient identifier can comprise a name, e-mail, phone number, internet protocol address or any other identifier that relates to a recipient device. For example, a subscriber may set his preference so that he receives just VM messages while on vacation and while his secretary is sent VMTT e-mails (or some other text based message format) of the messages he, the subscriber, receives. The subscriber may decide to set his preferences in this manner because when he is on vacation he may not want several messages cluttering his e-mail inbox, but he may desire that his secretary parse through the messages and take the appropriate action.

Figure 4:
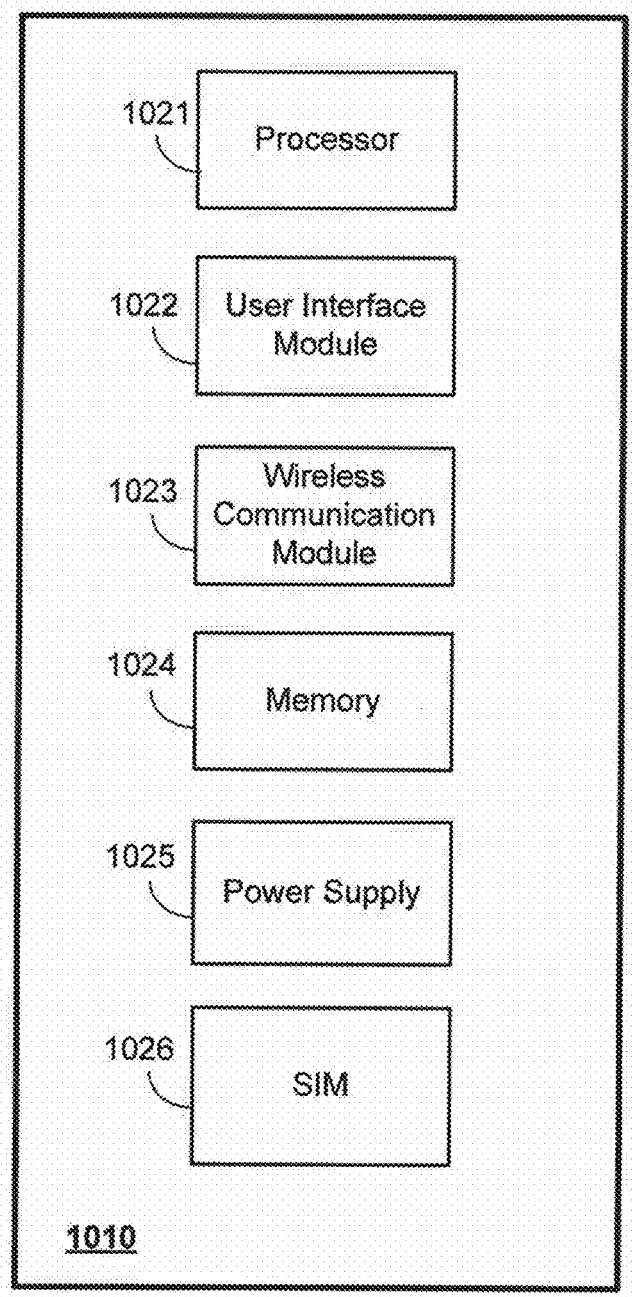
FIG. 4 is a block diagram of a non-limiting, exemplary wireless device that can be used in connection with on demand VMTT.

FIG. 4 illustrates an example wireless device 1010 that can be used in connection with an embodiment of on-demand voicemail to text transcription. References will also be made to other figures of the present disclosure as appropriate. For example, devices 120 and 130 can each be a wireless device of the type described in regard to FIG. 4, and can have some, all, or none of the components and modules described in regard to FIG. 4. It will be appreciated that the components and modules of wireless device 1010 illustrated in FIG. 4 are illustrative, and that any number and type of components and/or modules can be present in wireless device 1010. In addition, the functions performed by any or all of the components and modules illustrated in FIG. 4 can be performed by any number of physical components. Thus, it is possible that in some embodiments the functionality of more than one component and/or module illustrated in FIG. 4 can be performed by any number or types of hardware and/or software.

Processor 1021 can be any type of circuitry that performs operations on behalf of wireless device 1010. In one embodiment, processor 1021 executes software (i.e., computer readable instructions stored in a computer readable medium) that can include functionality related to transmitting and receiving telephonic communications including messages of any type, communicating with, operating, or interfacing with messaging systems or running software configured to operate, communicate, or interface with messaging systems, for example. User interface module 1022 can be any type or combination of hardware and/or software that enables a user to operate and interact with wireless device 1010, and, in one embodiment, to interact with a system or software enabling the user to place, request, send and/or receive messages, and/or a system or software enabling the user to view, modify, or delete related software objects. For example, user interface module 1022 can include a display, physical and/or "soft" keys, voice recognition software, microphone, speaker and the like. Wireless communication module 1023 can be any type or combination of hardware and/or software that enables wireless device 1010 to communicate with wireless network equipment. Memory 1024 enables wireless device 1010 to store information, such as preferences regarding message format (e.g., voice, video, text, multimedia, etc.) and a sender's audio, text, and/or multimedia message. Memory 1024 can take any form, such as internal random access memory (RAM), an SD card, a microSD card and the like. Power supply 1025 can be a battery or other type of power input (e.g., a charging cable that is connected to an electrical outlet, etc.) that is capable of powering wireless device 1010. SIM 1026 can be any type Subscriber Identity Module and can be configured on a removable or non-removable SIM card that allows wireless device 1010 to store data on SIM 1026.

Figure 5:
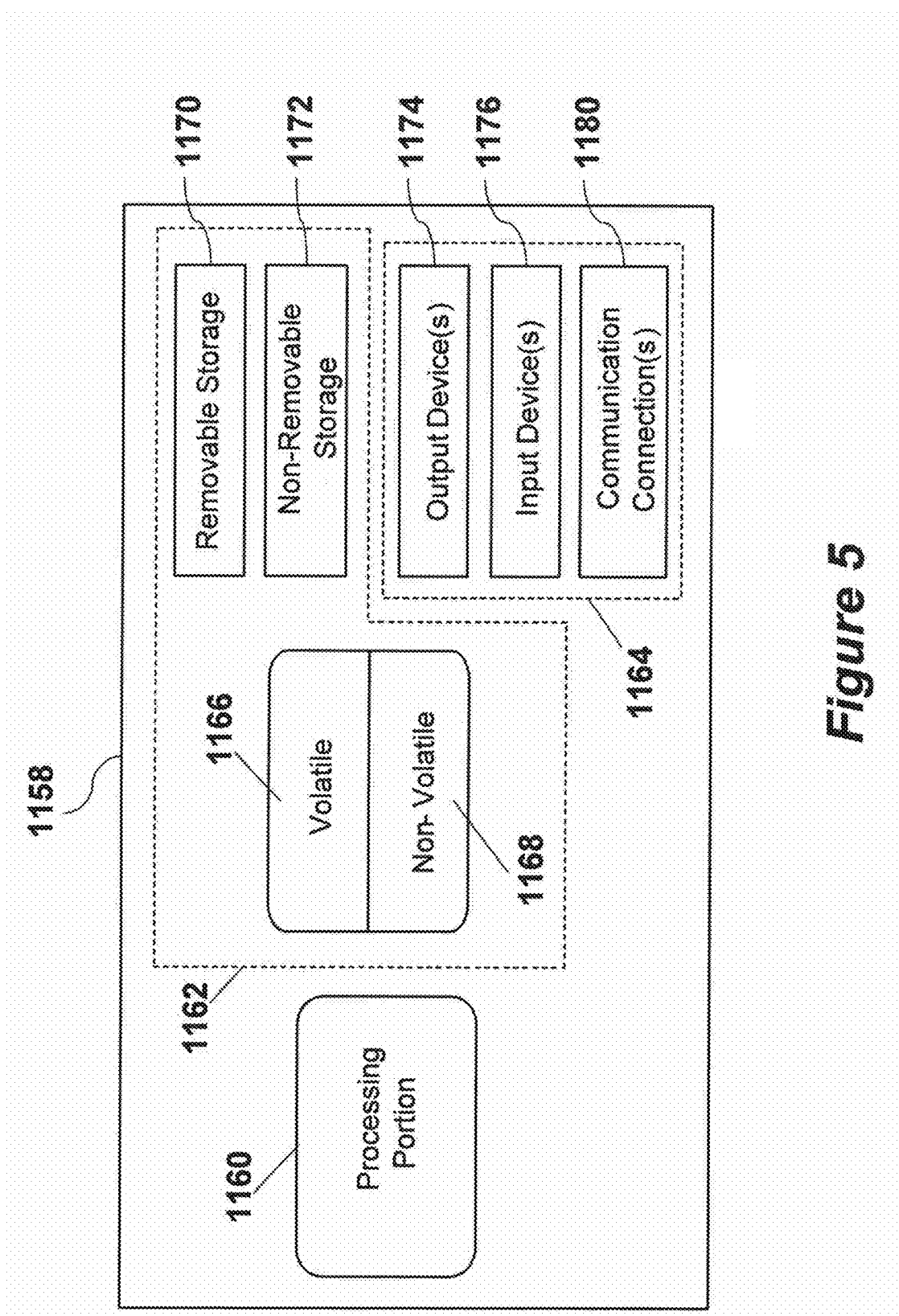
FIG. 5 is a block diagram of a non-limiting, exemplary processor in which on demand VMTT can be implemented.

FIG. 5 is a block diagram of an example processor 1158 which can be employed in any of the embodiments of on-demand voicemail to text transcription described herein, including as one or more components of devices 120 and 130, as one or more components of network equipment, VMTT equipment 110, or related equipment, such as any component shown in FIG. 1, and/or as one or more components of any third party system or subsystem that can implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, receive or convert audio, text, and multimedia messages, determine location information, or perform any other function described herein.

The processor 1158 can be implemented as a client processor and/or a server processor. In a basic configuration, the processor 1158 can include at least one processing portion 1160 and memory portion 1162. The memory portion 1162 can store any information utilized in conjunction with transmitting, receiving, and/or processing voice, data, other telephonic communications, etc. For example, the memory portion is capable of storing call preferences and/or software capable of processing call requests, receiving calls, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/ or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media can be part of the processor 1158.

The processor 1158 can also contain the communications connection(s) 1180 that allow the processor 1158 to communicate with other devices, for example through VMTT devices and network equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The network and nodes illustrated in FIG. 1 can comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how on demand VMTT can be implemented with stationary and non-stationary network structures and architectures. It can be appreciated, however, that methods and systems for providing on demand VMTT such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for providing on demand VMTT can be applied independently of the method of data transport, and do not depend on any particular network architecture, or underlying protocols.

Figure 6:
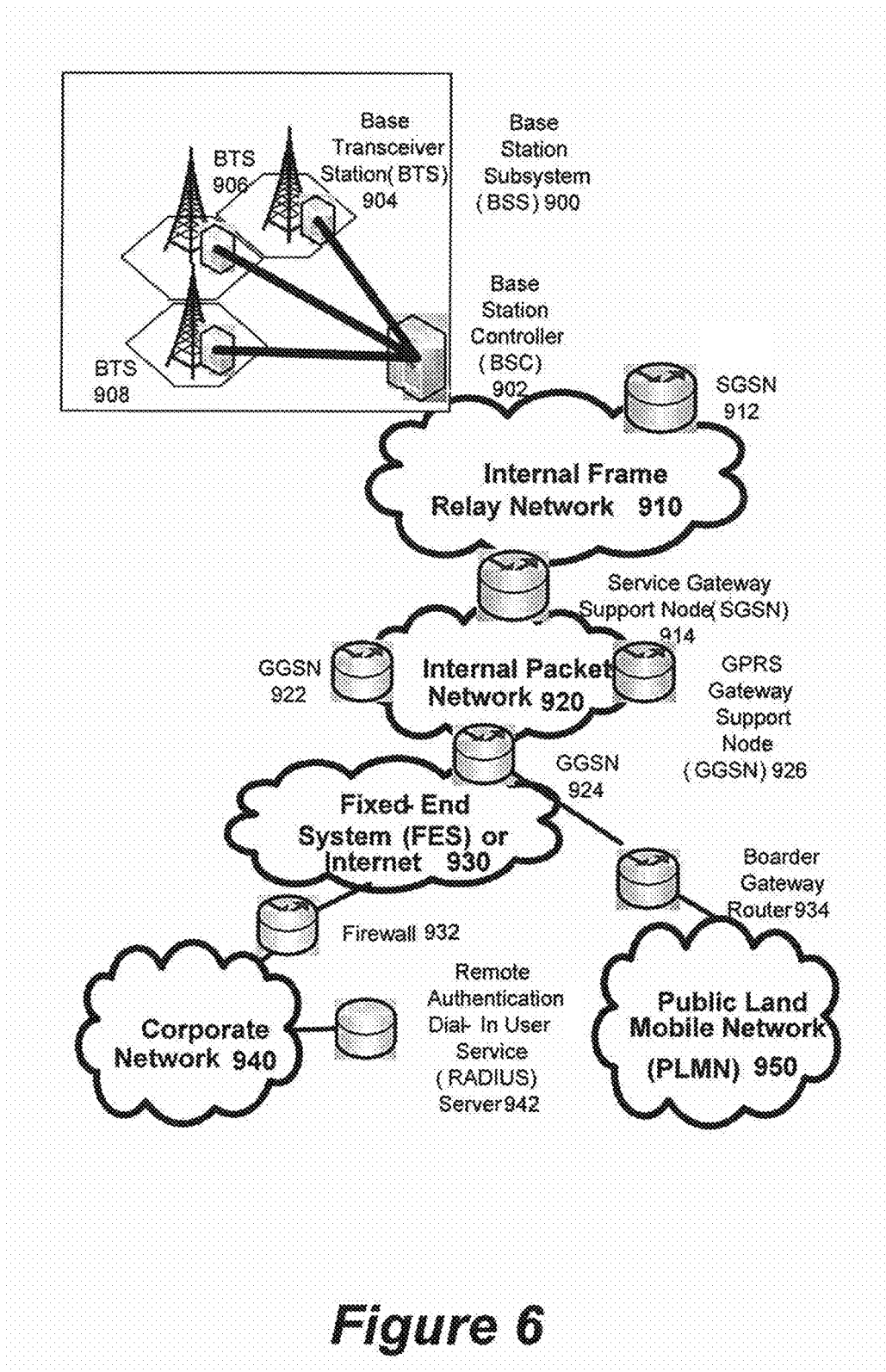
FIG. 6 is an overall block diagram of an exemplary packet-based mobile cellular network environment, such as a GPRS network, in which on demand VMTT can be implemented.

FIG. 6 depicts an overall block diagram of an exemplary packet-based mobile cellular network environment, such as a GPRS network, in which the systems and methods for providing on demand VMTT, such as those described herein can be practiced. In an example configuration, network 140 as illustrated in FIG. 1 can be encompassed by or interact with the network environment depicted in FIG. 6. Similarly, device 120, device 130, and VMTT device 110 can communicate or interact with a network environment such as that depicted in FIG. 6. In such an environment, there can be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., devices 120 and 130) become connected to the wireless network. In exemplary fashion, the packet traffic originating from user devices (e.g., devices 120 and 130) can be transported via an over-the-air interface to a BTS 908, and from the BTS 908 to the BSC 902. Base station subsystems, such as BSS 900, can be a part of internal frame relay network 910 that can include Service GPRS Support Nodes (SGSN) such as SGSN 912 and 914. Each SGSN can be connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 can be part of internal packet network 920. Gateway GPRS serving nodes 922, 924 and 926 can provide an interface to external Internet Protocol (IP) networks, such as Public Land Mobile Network (PLMN) 950, corporate intranets 940, or Fixed-End System (FES) or the public Internet 930. As illustrated, subscriber corporate network 940 can be connected to GGSN 924 via firewall 932, and PLMN 950 can be connected to GGSN 924 via border gateway router 934. The Remote Authentication Dial-In User Service (RADIUS) server 942 can be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells can be typically used in urban areas. Pico cells are small cells having a diameter of a few dozen meters. Pico cells can be used mainly indoors. On the other hand, umbrella cells can be used to cover shadowed regions of smaller cells and fill in gaps in coverage between those cells.

Figure 7:
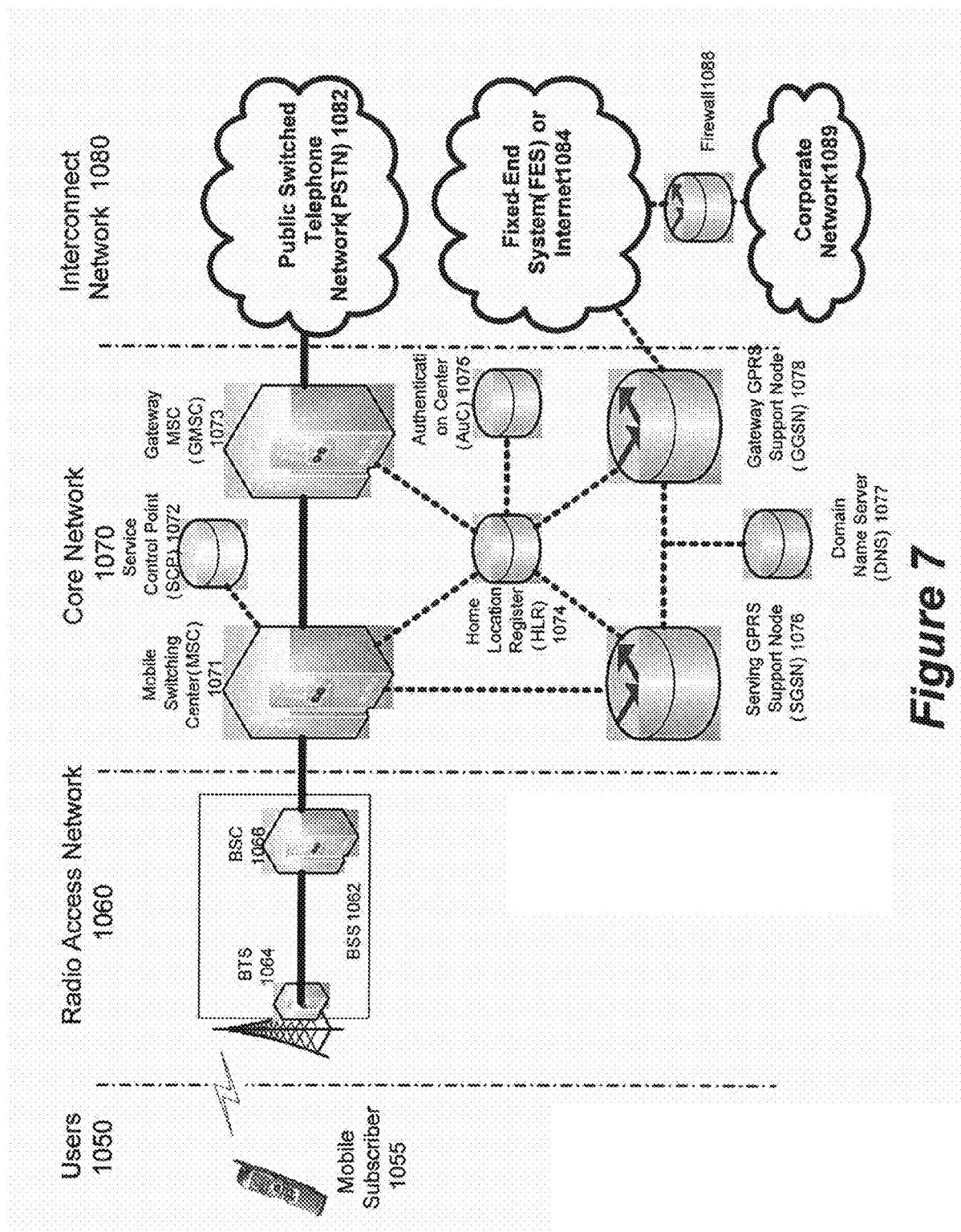
FIG. 7 illustrates a non-limiting, exemplary architecture of a typical GPRS network as segmented into four groups in which on demand VMTT can be implemented.

FIG. 7 illustrates a non-limiting, exemplary architecture of a typical GPRS network as segmented into four groups in which on demand VMTT can be implemented The four segmented groups can be: users 1050, radio access network 1060, core network 1070, and interconnect network 1080. Users 1050 can comprise a plurality of end users (though only mobile subscriber 1055 is shown in FIG. 7). In an example embodiment, the device depicted as mobile subscriber 1055 can comprise devices 120 and 130. Radio access network 1060 comprises a plurality of base station subsystems such as BSSs 1062, which include BTSs 1064 and BSCs 1066. Core network 1070 comprises a host of various network elements. As illustrated here, core network 1070 can comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 can also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center can be connected to a large number of base station controllers. At MSC 1071, for instance, depending on the type of traffic, the traffic can be separated in that voice can be sent to Public Switched Telephone Network (PSTN) 1082 through Gateway MSC (GMSC) 1073, and/or data can be sent to SGSN 1076, which then sends the data traffic to GGSN 1078 for further forwarding.

When MSC 1071 receives call traffic, for example, from BSC 1066, it can send a query to a database hosted by SCP 1072. The SCP 1072 can process the request and can issue a response to MSC 1071 so that it can continue call processing as appropriate.

The HLR 1074 can be a centralized database for users to register to the GPRS network. HLR 1074 can store static information about the subscribers such as the International Mobile Subscriber Identity (IMSI), subscribed services, and a key for authenticating the subscriber. HLR 1074 can also store dynamic subscriber information such as the current location of the mobile subscriber. HLR 1074 can also serve to intercept and determine the validity of destination numbers in messages sent from a device, such as mobile subscriber 1055, as described herein. Associated with HLR 1074 can be AuC 1075. AuC 1075 can be a database that contains the algorithms for authenticating subscribers and can include the associated keys for encryption to safeguard the user input for authentication.

In the following, depending on context, the term "mobile subscriber" sometimes refers to the end user and sometimes to the actual portable device, such as device 120 or 130, used by an end user of a mobile cellular service or a wireless provider. When a mobile subscriber turns on his or her mobile device, the mobile device can go through an attach process by which the mobile device attaches to an SGSN of the GPRS network. In FIG. 7, when mobile subscriber 1055 initiates the attach process by turning on the network capabilities of the mobile device, an attach request can be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 can request more information from mobile subscriber 1055. This information can be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 can notify the old SGSN, to which mobile subscriber 1055 was attached before, to cancel the location process for mobile subscriber 1055. HLR 1074 can then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 can then go through the authentication process. In the authentication process, SGSN 1076 can send the authentication information to HLR 1074, which can send information back to SGSN 1076 based on the user profile that was part of the user's initial setup. The SGSN 1076 can then send a request for authentication and ciphering to mobile subscriber 1055. The mobile subscriber 1055 can use an algorithm to send the user identification (ID) and password to SGSN 1076. The SGSN 1076 can use the same algorithm and compares the result. If a match occurs, SGSN 1076 authenticates mobile subscriber 1055.

Next, the mobile subscriber 1055 can establish a user session with the destination network, corporate network 1089, by going through a Packet Data Protocol (PDP) activation process. Briefly, in the process, mobile subscriber 1055 can request access to the Access Point Name (APN), for example, UPS.com, and SGSN 1076 can receive the activation request from mobile subscriber 1055. SGSN 1076 can then initiate a Domain Name Service (DNS) query to learn which GGSN node has access to the UPS.com APN. The DNS query can be sent to the DNS server within the core network 1070, such as DNS 1077, which can be provisioned to map to one or more GGSN nodes in the core network 1070. Based on the APN, the mapped GGSN 1078 can access the requested corporate network 1089. The SGSN 1076 can then send to GGSN 1078 a Create Packet Data Protocol (PDP) Context Request message that contains necessary information. The GGSN 1078 can send a Create PDP Context Response message to SGSN 1076, which can then send an Activate PDP Context Accept message to mobile subscriber 1055.

Once activated, data packets of the call made by mobile subscriber 1055 can then go through radio access network 1060, core network 1070, and interconnect network 1080, in a particular fixed-end system, or Internet 1084 and firewall 1088, to reach corporate network 1089.

Thus, network elements that can invoke the functionality of providing on demand VMTT such as those described herein can include but are not limited to Gateway GPRS Support Node tables, Fixed End System router tables, firewall systems, VPN tunnels, and any number of other network elements as required by the particular digital network.

Figure 8:
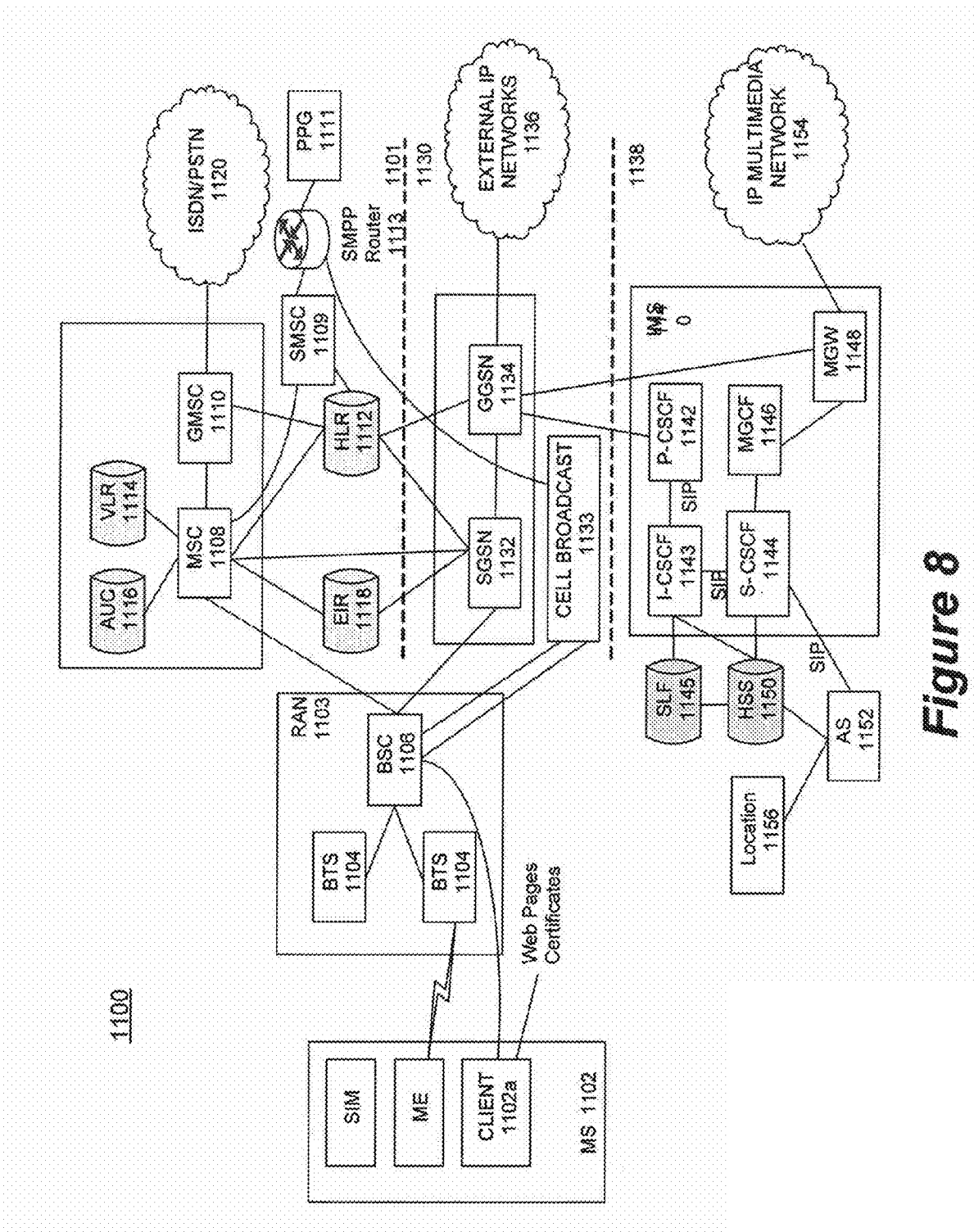
FIG. 8 illustrates a non-limiting alternate block diagram of an exemplary GSM/GPRS/IP multimedia network architecture network in which on demand VMTT can be implemented.

FIG. 8 illustrates another exemplary block diagram view of a GSM/GPRS/IP multimedia network architecture 1100 in which the systems and methods for providing on demand VMTT, such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., devices 120 and 130) that is used by mobile subscribers, in one embodiment with a Subscriber identity Module (SIM). The SIM includes an International Mobile Subscriber Identity (IMSI), which is a unique identifier of a subscriber. The BTS 1104 can be physical equipment, such as a radio tower, that enables a radio interface to communicate with the MS. Each BTS can serve more than one MS. The BSC 1106 can manage radio resources, including the BTS. The BSC can be connected to several BTSs. The BSC and BTS components, in combination, are generally referred to as a base station (BSS) or radio access network (RAN) 1103.

The GSM core network 1101 can also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 can perform a switching function for the network. The MSC can also perform other functions, such as registration, authentication, location updating, handovers, and call routing. The GMSC 1110 can provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that can contain administrative information regarding each subscriber registered in a corresponding GSM network. The HLR 1112 can also contain the current location of each MS. The VLR 1114 can be a database that contains selected administrative information from the HLR 1112. The VLR can contain information necessary for call control and provision of subscribed services for each MS currently located in a geographical area controlled by the VLR. The HLR 1112 and the VLR 1114, together with the MSC 1108, can provide the call routing and roaming capabilities of GSM. The AuC 1116 can provide the parameters needed for authentication and encryption functions. Such parameters allow verification of a subscriber's identity. The EIR 1118 can store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 can be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS can first register with the network to indicate its current location by performing a location update and IMSI attach procedure. MS 1102 can send a location update including its current location information to the MSC/VLR, via BTS 1104 and BSC 1106. The location information can then be sent to the MS's HLR. The HLR can be updated with the location information received from the MSC/VLR. The location update can also be performed when the MS moves to a new location area. Typically, the location update can be periodically performed to update the database as location updating events occur.

GPRS network 1130 can be logically implemented on the GSM core network architecture by introducing two packet-switching network nodes, a serving GPRS support node (SGSN) 1132, a cell broadcast and a Gateway GPRS support node (GGSN) 1134. The SGSN 1132 can be at the same hierarchical level as the MSC 1108 in the GSM network. The SGSN can control the connection between the GPRS network and the MS 1102. The SGSN can also keep track of individual MS's locations and security functions and access controls.

Cell Broadcast Center (CBC) 1133 can communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 can provide a gateway between the GPRS network and a public packet network (PDN) or other IP networks 1136. That is, the GGSN can provide interworking functionality with external networks, and set up a logical link to the MS through the SGSN. When packet-switched data leaves the GPRS network, it can be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS can also support simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 can be designed to operate in three network operation modes (NOM1, NOM2 and NOM3). A network operation mode of a GPRS network can be indicated by a parameter in system information messages transmitted within a cell. The system information messages can direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and can include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 can be common to GSM core network 1101, GPRS network 1130 as well as IP multimedia network 1138.

IP multimedia system 1140 can be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 can forward session initiation protocol (SIP) messages received from the MS to an SIP server in a home network (and vice versa) of the MS. The P-CSCF 1142 can also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 can contact subscriber location function (SLF) 1145 to determine which HSS 1150 to use for the particular subscriber, if multiple HSSs 1150 are present. S-CSCF 1144 can perform the session control services for MS 1102. This includes routing originating sessions to external networks and routing terminating sessions to visited networks. S-CSCF 1144 can also decide whether an application server (AS) 1152 is required to receive information on an incoming SIP session request to ensure appropriate service handling. This decision is based on information received from HSS 1150 (or other sources, such as application server 1152). AS 1152 can also communicate to location server 1156 (e.g., a Gateway Mobile Location Center (GMLC)) that provides a position (e.g., latitude/longitude coordinates) of MS 1102.

HSS 1150 can contain a subscriber profile and keep track of which core network node is currently handling the subscriber. It can also support subscriber authentication, accounting, and authorization functions (AAA). In networks with more than one HSS 1150, a subscriber location function provides information on the HSS 1150 that contains the profile of a given subscriber.

MGCF 1146 can provide interworking functionality between SIP session control signaling from the IMS 1140 and ISUP/BICC call control signaling from the external GSTN networks (not shown). It can also control the media gateway (MGW) 1148 that provides user-plane interworking functionality (e.g., converting between AMR- and PCM-coded voice.) MGW 1148 can also communicate with other IP multimedia networks 1154.

Push to Talk over Cellular (PoC) capable mobile telephones can register with the wireless network when the telephones are in a predefined area (e.g., job site, etc.) When the mobile telephones leave the area, they can register with the network in their new location as being outside the predefined area. This registration, however, does not indicate the actual physical location of the mobile telephones outside the predefined area.

While example embodiments of systems and methods for on demand VMTT, such as those described herein, have been described in connection with various communications devices and computing devices/processors, the underlying concepts can be applied to any communications or computing device, processor, or system capable of implementing the messaging systems and methods for on-demand voice mail to text transcription. The various techniques described herein can be implemented in connection with hardware or software or, where appropriate, with a combination of both. Thus, the methods and apparatuses for providing on demand VMTT, or certain aspects or portions thereof, can take the form of program code (i.e., instructions) embodied in tangible media having a tangible physical structure, such as floppy diskettes, CD-ROMs, hard drives, or any other machine-readable storage medium, wherein, when the program code is loaded into and executed by a machine, such as a computer, the machine becomes an apparatus for providing messaging services. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for providing on demand VMTT as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing on demand VMTT. When implemented on a general-purpose processor, the program code combines with the processor to provide a unique apparatus that operates to invoke the functionality of a VMTT device intelligent enough to translate audio to e-mail, SMS, or other text messages and transmit them according to available variables. Additionally, any storage techniques used in connection with on-demand voice mail to text transcription can invariably be a combination of hardware and software.

While on demand VMTT has been described in connection with the various embodiments of the various figures, it is to be understood that other similar embodiments can be used or modifications and additions can be made to the described embodiment for performing the same function of providing on demand VMTT without deviating therefrom. For example, one skilled in the art will recognize that providing on demand VMTT as described in the present application can apply to any environment, whether wired or wireless, and can be applied to any number of such devices connected via a communications network and interacting across the network. Therefore, providing on demand VMTT should not be limited to any single embodiment, but rather should be construed in breadth and scope in accordance with the appended claims.

What is claimed:

1. A method comprising:
   receiving, by a network device, a voicemail message;
   receiving, by the network device, a request from a mobile device to retrieve the voicemail message;
   requesting, by the network device, a status of a network resource associated with the mobile device, the requesting of the status occurring after receiving the request to retrieve the voicemail message from the mobile device, the network resource comprising at least one of:
   a router, a switch, a network tower, or a landline;
   receiving, by the network device, an indication of the status of the network resource; and
   providing, by the network device, instructions to transcribe, from audio to text, a voicemail message based on the received status of the network resource.

2. The method of claim 1, wherein the mobile device comprises a default device.

3. The method of claim 1, wherein the mobile device comprises a device that is retrieving the voicemail message.

4. The method of claim 1, further comprising transmitting a voicemail to text descriptor with a visual voicemail message, the voicemail to text descriptor indicating whether the voicemail should be subsequently transcribed when a subscriber level filed is set from off to on.

5. A voicemail to text device comprising:
   a processor; and
   memory coupled to the processor, the memory having stored thereon executable instructions that when executed by the processor cause the processor to effectuate operations that comprise:
   request a status of a network resource associated with the mobile device after receiving the request to retrieve the voicemail message from the mobile device, the network resource comprising at least one of:
   a router, a switch, a network tower, or a landline;
   receive an indication of the status of the network resource;
   and
   provide instructions to transcribe, from audio to text, a voicemail message based on the received status of the network resource.

6. The voicemail to text device of claim 5, wherein the mobile device comprises a default device.

7. The voicemail to text device of claim 5, wherein the mobile device comprises a device that is retrieving the voicemail message.

8. The voicemail to text device of claim 5, wherein the status of the network resource comprises an amount of memory of the network resource.

9. The voicemail to text device of claim 5, wherein the status of the network resource comprises a software version of the network resource.

10. A system comprising:
   a mobile device; and
   a voicemail to text device comprising:
      a processor; and
      a memory coupled to the processor, the memory having stored thereon executable instructions that when executed by the processor cause the processor to effectuate operations comprising:
      receive a voicemail message;
      receive a request from the mobile device to retrieve the voicemail message;
      request a status of a network resource associated with the mobile device after receiving the request to retrieve the voicemail message from the mobile device, the network resource comprising at least one of:
      a router, a switch, a network tower, or a landline;
      receive an indication of the status of the network resource; and
      provide instructions to transcribe, from audio to text, a voicemail message based on the received status of the network resource.

* * * * *